UNITED STATES PATENT OFFICE.

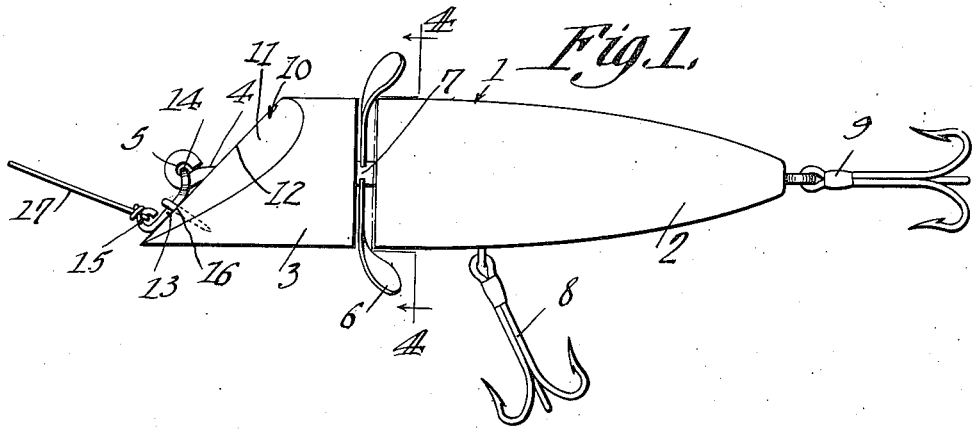
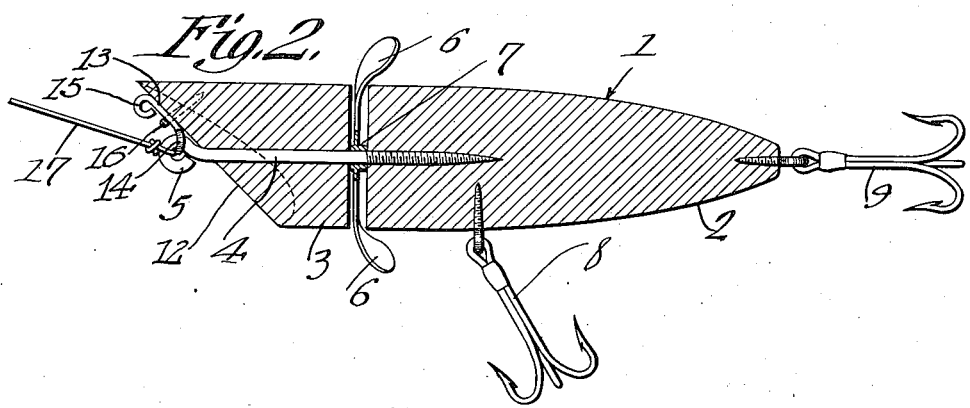
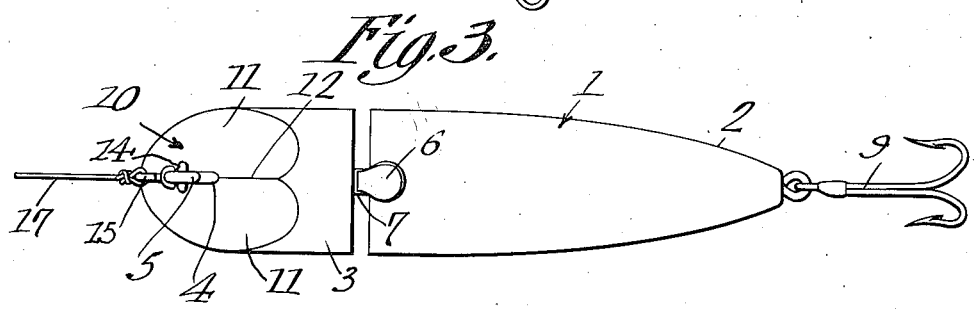
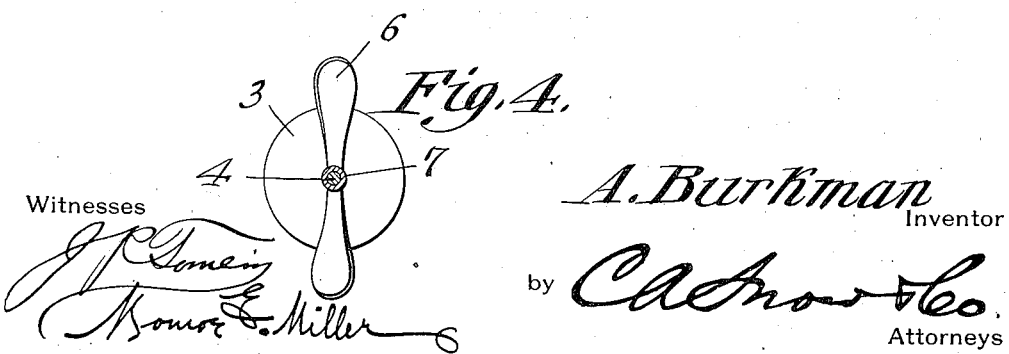

ARTHUR BURKMAN, OF TRAVERSE CITY, MICHIGAN.

ARTIFICIAL BAIT.

1,155,883.  Specification of Letters Patent.  Patented Oct. 5, 1915.

Application filed March 11, 1915. Serial No. 13,636.

*To all whom it may concern:*

Be it known that I, ARTHUR BURKMAN, a citizen of the United States, residing at Traverse City, in the county of Grand Traverse and State of Michigan, have invented a new and useful Artificial Bait, of which the following is a specification.

The present invention appertains to artificial fishing baits, and aims to provide a novel and improved bait of such construction, that it is capable of movement, by a proper setting thereof, either under or upon the water, whereby the bait may be employed as a diving or under water bait, or as a skipping or surface bait.

Another object of the invention is the provision of an artificial bait which may be readily converted into either a diving or a skipping bait, and the construction of which is comparatively simple and inexpensive.

A further object of the present invention is the provision of a bait of the nature indicated, having assembled therewith, a spinner, and line attaching means whereby the line may be properly attached to the bait according to the manner in which the bait is used.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a side elevation of the improved bait, illustrating the same as used for a diving or under water bait. Fig. 2 is a longitudinal section of the device, showing the same when in position for use as a skipping or surface bait. Fig. 3 is a plan view of the bait with the parts arranged as seen in Fig. 1. Fig. 4 is a cross section taken on the line 4—4 of Fig. 1.

In carrying out the invention, there is provided a buoyant or flotative body 1, preferably constructed of wood or similar light buoyant material, and enameled or finished in any suitable manner. The body 1 is divided between its ends, to provide a rear section 2, and a forward section or head 3. The sections 2 and 3 are in alinement and are spaced slightly apart.

The sections 2 and 3 are connected together by means of a screw or stem 4 which has its shank engaged longitudinally through the section or head 3 and which has its threaded end portion threaded into the forward end of the rear section 2. The screw or stem 4 is disposed axially of the sections, and is provided at its forward end with a line attaching eye 5 adjacent the forward end or face of the section or head 3.

A spinner 6 is mounted for rotation between the sections 2 and 3 and has its hub 7 journaled upon the shank of the screw 4 between the sections, and the blades of the spinner project slightly from between the sections, in order that the spinner will be rotated when the bait is drawn through the water, to give a life-like motion to the bait, for attracting the fish.

The rear section 2 is provided with a lower depending hook 8, and a trailing or tail hook 9, for snagging or attacking the fish attracted by the bait.

The forward end or face of the section or head 3 is inclined, as at 10, and the face 10 is V-shaped, to provide the plane surfaces 11 diverging rearwardly toward the sides of the body from the ridge 12 between the plane surfaces 11.

The diverging surfaces are inclined both longitudinally and laterally, and the ridge 12 is inclined longitudinally, whereby the inclined face will serve its function in a most efficient and desirable manner.

In addition to the eye 5, the bait is provided with a second line attaching means, and to this end a wire element 13 which is disposed along the ridge 12 between the eye 5 and nose of the section or head 3, is provided at one end with an eye or loop 14 embracing one side portion of the eye 5, and is provided with an outstanding or forwardly projecting eye or loop 15 at its other end and adjacent the nose or point of the section 3.

A staple or other securing element 16 straddles or engages the intermediate portion of the wire element 13 and engages into the section 3 for clamping the wire element 13 in place. Thus, the line 17 may be attached either to the eye 5, or the eye 15.

When the bait is used as a diving or under water bait, the section 3 is rotated so that its face 19 is inclined rearwardly, as seen in Fig. 1, and the line 17 is attached to the lower eye 15 which is arranged adjacent the point or nose of the section 3. The bait is then cast in the usual manner, and when the line 17 is given a sharp jerk or pull, the bait will dive into the water, due to the fact that the inclined face 10 of the section 3 will direct the body of the bait downwardly into the water. As soon as the line 17 is slackened, the bait will rise to the surface of the water, and by properly manipulating the line, the bait may be made to dive and rise to the surface at will.

By reversing the position of the section 3, that is, by rotating the section 3 so that the face 10 thereof is inclined forwardly, the bait will skip over the surface of the water. In this use of the bait, the line 17 is attached to the central eye 5, in order that the bait will be drawn properly over the surface of the water, it being noted that the inclined face 10 impinging against the water, will tend to raise the bait off of the surface of the water. Consequently, the bait will be given a skipping motion upon the surface of the water.

It is essential that the section 3 be equipped with a plurality or series of line attaching means extending along the ridge 12 in order that the line may be properly attached to the bait when the bait is used in the different manners above indicated, and it will be noted that the line being attached to the bait at the ridge 12, will serve to steady the motion of the bait through the water, since the rearwardly diverging plane surfaces 11 will tend to maintain the bait in a straight-line motion. The bait, however, will move laterally or side wise sufficiently for simulating the movements of a live bait, and the spinner 6 being rotated will add to the life-like appearance of the bait.

If desired, the spinner may be removed or omitted, and in which event the sections of the body may be brought into abutment with one another.

Having thus described the invention, what is claimed as new is:

1. A buoyant bait body, the forward end of which has a longitudinally inclined face comprising plane surfaces diverging rearwardly to the sides of the body and having a ridge therebetween, the surfaces being inclined longitudinally and laterally, and the ridge being inclined longitudinally, and a series of line attaching means carried by the body along said ridge.

2. An artificial bait comprising a body embodying a hook carrying section and a rotatable section, the rotatable section having a forward longitudinally inclined face comprising plane surfaces diverging rearwardly to the sides of the body and having a ridge therebetween, said surfaces being inclined longitudinally and laterally, and a ridge being inclined longitudinally, and a series of line attaching means carried by the rotatable section along said ridge.

In testimony that I claim the foregoing as my own, I have hereto affixed my signature in the presence of two witnesses.

ARTHUR BURKMAN.

Witnesses:
 JOSEF POSPISILZ,
 CHAS. H. HANSLOVSKY.